(12) United States Patent
Goldberg et al.

(10) Patent No.: US 8,312,549 B2
(45) Date of Patent: Nov. 13, 2012

(54) PRACTICAL THREAT ANALYSIS

(76) Inventors: Ygor Goldberg, Tel Aviv (IL); Michael Levy, Tel Aviv (IL)

(*) Notice: Subject to any disclaimer, the term of this patent is extended or adjusted under 35 U.S.C. 154(b) by 867 days.

(21) Appl. No.: 11/194,537

(22) Filed: Aug. 2, 2005

(65) Prior Publication Data

US 2007/0016955 A1    Jan. 18, 2007

Related U.S. Application Data

(60) Provisional application No. 60/612,527, filed on Sep. 24, 2004.

(51) Int. Cl.
*H04L 29/06* (2006.01)

(52) U.S. Cl. ............... 726/25; 726/22; 726/23; 726/24; 726/26; 726/2; 713/189; 713/154; 705/7.11; 705/7.28

(58) Field of Classification Search .................. None
See application file for complete search history.

(56) References Cited

U.S. PATENT DOCUMENTS

| | | | |
|---|---|---|---|
| 6,895,383 B2 * | 5/2005 | Heinrich | 705/7.28 |
| 7,243,374 B2 * | 7/2007 | Howard et al. | 726/25 |
| 7,386,883 B2 * | 6/2008 | Bardsley et al. | 726/22 |
| 7,552,480 B1 * | 6/2009 | Voss | 726/25 |
| 7,657,942 B2 * | 2/2010 | Himberger et al. | 726/25 |
| 7,712,137 B2 * | 5/2010 | Meier | 726/25 |
| 7,743,421 B2 * | 6/2010 | Cosquer et al. | 726/25 |
| 7,818,788 B2 * | 10/2010 | Meier | 726/4 |
| 7,890,315 B2 * | 2/2011 | Meier et al. | 703/22 |
| 7,900,259 B2 * | 3/2011 | Jeschke et al. | 726/25 |
| 7,953,620 B2 * | 5/2011 | Scates | 705/7.11 |
| 8,046,253 B2 * | 10/2011 | Scates | 705/7.28 |
| 8,091,065 B2 * | 1/2012 | Mir et al. | 717/104 |
| 8,103,601 B2 * | 1/2012 | Hnatio | 706/14 |
| 8,112,304 B2 * | 2/2012 | Scates | 705/7.36 |
| 8,122,510 B2 * | 2/2012 | Byers et al. | 726/25 |
| 8,141,155 B2 * | 3/2012 | Jeschke et al. | 726/22 |
| 8,201,257 B1 * | 6/2012 | Andres et al. | 726/25 |
| 8,209,246 B2 * | 6/2012 | Lawrence | 705/35 |
| 8,209,760 B1 * | 6/2012 | Hardman | 726/25 |
| 8,220,056 B2 * | 7/2012 | Owens, Jr. | 726/25 |
| 2003/0046128 A1 | 3/2003 | Heinrich | 705/7 |
| 2003/0182337 A1 | 9/2003 | Wefers et al. | 708/490 |
| 2004/0015375 A1 * | 1/2004 | Cogliandro | 705/7 |
| 2004/0193870 A1 * | 9/2004 | Redlich et al. | 713/154 |
| 2004/0230437 A1 * | 11/2004 | Havrilak, Jr. | 705/1 |
| 2005/0004863 A1 * | 1/2005 | Havrilak | 705/38 |
| 2005/0086090 A1 * | 4/2005 | Abrahams et al. | 705/7 |

OTHER PUBLICATIONS

International Preliminary Report on Patentability published Mar. 24, 2009 for PCT/IL05/01020 filed Sep. 22, 2005 (claiming priority to U.S. Appl. No. 11/194,537).
Written Opinion published Mar. 20, 2009 for PCT/IL05/01020 filed Sep. 22, 2005 (claiming priority to U.S. Appl. No. 11/194,537).
International Search Reports published Apr. 23, 2009 for PCT/IL2005/001020 filed Sep. 22, 2005 (claiming priority to U.S. Appl. No. 11/194,537).

* cited by examiner

*Primary Examiner* — Syed A. Zia
(74) *Attorney, Agent, or Firm* — Marty Fleit; Paul D. Bianco; Fleit Gibbons Gutman Bongini Bianco PL

(57) ABSTRACT

The following subject matter provides a computer-implemented method and system for calculation of cost-effectiveness of countermeasures in mitigating the threats on a system through calculating risk of threats. The calculation is run on a model of assets, threats, vulnerabilities and countermeasures and enables the production of easy to understand reports and action item lists showing the financial value of threat risks and countermeasures priorities and cost-effectiveness.

10 Claims, 4 Drawing Sheets

PRACTICAL THREAT ANALYSIS

CROSS-REFERENCE TO RELATED APPLICATIONS

This application claims the benefit under 35 U.S.C. §119(e) of Provisional Application No. 60/612,527, filed Sep. 24, 2004.

BACKGROUND

The present invention relates to methods for managing threats on systems and to managing countermeasures for mitigating the threats.

Threat analysis is an ongoing process whose aim is to mitigate the risk posed by different types of threats, reduce damages and ensure the continuity, availability and successful operation of systems. It involves assessment of potentially damageable assets, modeling threats and vulnerabilities and valuating risks and countermeasures. The progresses in computing and communications together with the globalization of economical and social processes has emphasized the need for proactively analyzing risks and constantly evolving assessment models of realist threats against systems. Optimally, threat models should be constructed from the very first steps of system planning, taken into consideration in advanced design stages and continuously maintained and updated through the whole life cycle of the system.

Threat modeling involves identifying the assets of the system that are at risk, identifying system vulnerabilities and weaknesses and discovering scenarios of threats that can take advantage of these vulnerabilities and damage the assets. The outcome of the process is a set of proposed countermeasures that might mitigate the threats that were identified. The prosperity of the system directly depends on the effectiveness of the efforts invested in protecting the system assets against the identified threats. Since the implementation of all of the proposed countermeasures is, in most cases, impractical due to limitations of budget, time and resources, the goal of a beneficial threat analysis process is to propose the set of the most cost-effective countermeasures against the identified threats.

The effectiveness of a countermeasure is measured by the overall mitigation it provides to the system risks in relation to the cost of implementing it. One can use the above measure of effectiveness of countermeasures in order to decide upon the priorities in implementing the countermeasures. The outcome is a realistic item list of actions to be taken in each stage of the system life cycle.

US Patent Applications 20030046128 is a computer-implemented method and system for assessing the overall risk in at least part of an information technology system includes inputting into a risk assessment database a plurality of identified risks in a system; associating the risks to at least one severity band in a risk echelon; assigning a value to each risk; multiplying each risk value by a coefficient factor; and summing the factored risk values to determine the overall risk. The method preferably includes modifying the security implementation of the information technology system and determining the modified overall risk. The system preferably includes an automated vulnerability detection scanner to gather risk information, which is stored on a database and used in calculating the overall risk.

US Patent Applications 20030182337 discloses a method, system and computer product for risk valuation. A computer assigns a risk to an object. The object has an object measure-value and the risk has at least one threat level. The computer receives a probability of the threat level. The probability refers to the object. The computer calculates the object measure-value by using the probability of the threat level and by using a deviation-value that corresponds to the threat level and relates to the object. The article "Paranoid Penguin: Practical Threat Analysis and Risk Management" published at http://www.linuxjournal.com/article.php?sid=5567 describes a risk valuation method in which for each vulnerability associated with each asset, the estimated cost of replacing or restoring that asset is calculated (its single loss expectancy) and then the vulnerability's expected annual rate of occurrence is estimated. The annual vulnerability loss expectancy may be calculated by multiplying these two factors.

Attack Trees as described in http://www.schneier.com/paper-attacktrees-ddj-ft.html provide a formal methodology for analyzing the security of systems and subsystems. They provide a way to think about security, to capture and reuse expertise about security, and to respond to changes in security. According to the suggested perspective security should be viewed as a process and attack trees form the basis of understanding that process.

The Threat Modeling Tool, as described in http://www.microsoft.com/downloads/details.aspx?familyid=62830f95-0e61-4f87-88a6-e7c663444ac1&displaylang=en allows users to create threat model documents for applications. It organizes relevant data points, such as entry points, assets, trust levels, data flow diagrams, threats, threat trees, and vulnerabilities into an easy-to-use tree-based view. The tool saves the document as XML, and may export to HTML and MHT using the included XSLTs, or a custom transform supplied by the user.

As described above there are at present several methodologies and tools for assessing risks in various systems domains. These tools provide static lists of individual risks but do not give a true picture of the relative contribution of each threat to the overall risk combined with the cost-effectiveness of the proposed countermeasures. Other methodologies are based on creation of attack trees that provides a clearer understanding of the attack options from the opponent's point of view. Although these methodologies may be helpful in valuating probabilities of threats, they do not relate to the ranking of countermeasures by their effectiveness.

These methodologies and tools do not provide means for the creation of threat models where threats and countermeasures are classified according to a clear significance metrics, in order to facilitate a cost effective decision making process needed for protecting contemporary systems.

There is an obvious need for a practical threat analysis methodology and tools for maintaining a dynamic threats model and are capable of reacting to changes in system's assets and vulnerabilities by automatically recalculating threats and countermeasures priorities and providing decision makers with updated realistic action item lists that reflect the changes in threats realities. Countermeasure priorities should be expressed as a function of system asset values, degrees of damage, threat probabilities and degrees of mitigation provided by the proposed countermeasures to the threats.

SUMMARY

Disclosed is a method for performing risk management of a given system having known vulnerabilities and weaknesses, based on the assets values of the system, the risks of possible threats, potential asset damages in relation to each threat, possible countermeasure and relative threat mitigation in relation to a single countermeasure or to a set of countermeasures. The method comprises the following steps: valuating relative threat monetary risk. Each threat is correlated to the possible damage to system assets based on possible threat scenarios in accordance with relevant vulnerabilities and weaknesses of the system and valuation of relative threat damage. Calculating cost effectiveness for each countermeasure or each set of countermeasures, taking into account the relative relevant threats damages and estimating the contribution of each countermeasure or set of countermeasures to reduce said damages. The method also includes the step of calculating the current overall countermeasure mitigation level for each countermeasure. The current overall countermeasure mitigation (CurCM) of a specific countermeasure is the percentage of contribution of a specific countermeasure to the reduction of the current total system risk.

The current cost effectiveness (CurCCE) of a specific countermeasure is calculated by dividing the overall countermeasure mitigation by the implementation cost (IC) of the countermeasure. Valuating relative threat risk is based on calculating the following: the mitigation level for each threat, calculating the total value of and relative value of system assets, calculating the relative damage level of each threat, calculating the risk level of each threat, calculating the risk for each asset and calculating the total system risk.

The method also includes the step of calculating an optimized risk reduction plan, wherein. The optimized risk reduction plan is an optimized subset of the countermeasures that if implemented will reduce the total current risk level below a given target risk level within the limits of a given target budget (TarB).

The optimization is based on optimizing cost effectiveness, optimizing the risk, optimizing the cost, or optimizing countermeasure execution complexity. The optimization includes an iterative process for testing various combinations of counter measurements. The optimization process may be performed manually enabling the user to change combinations according the received mitigation results, or automatically, wherein the combinations are changed in accordance with calculated mitigation results.

BRIEF DESCRIPTION OF THE DRAWINGS

These and further features and advantages of the invention will become more clearly understood in the light of the ensuing description of a preferred embodiment thereof, given by way of example, with reference to the accompanying drawings, wherein—

GLOSSARY

Figure 1:
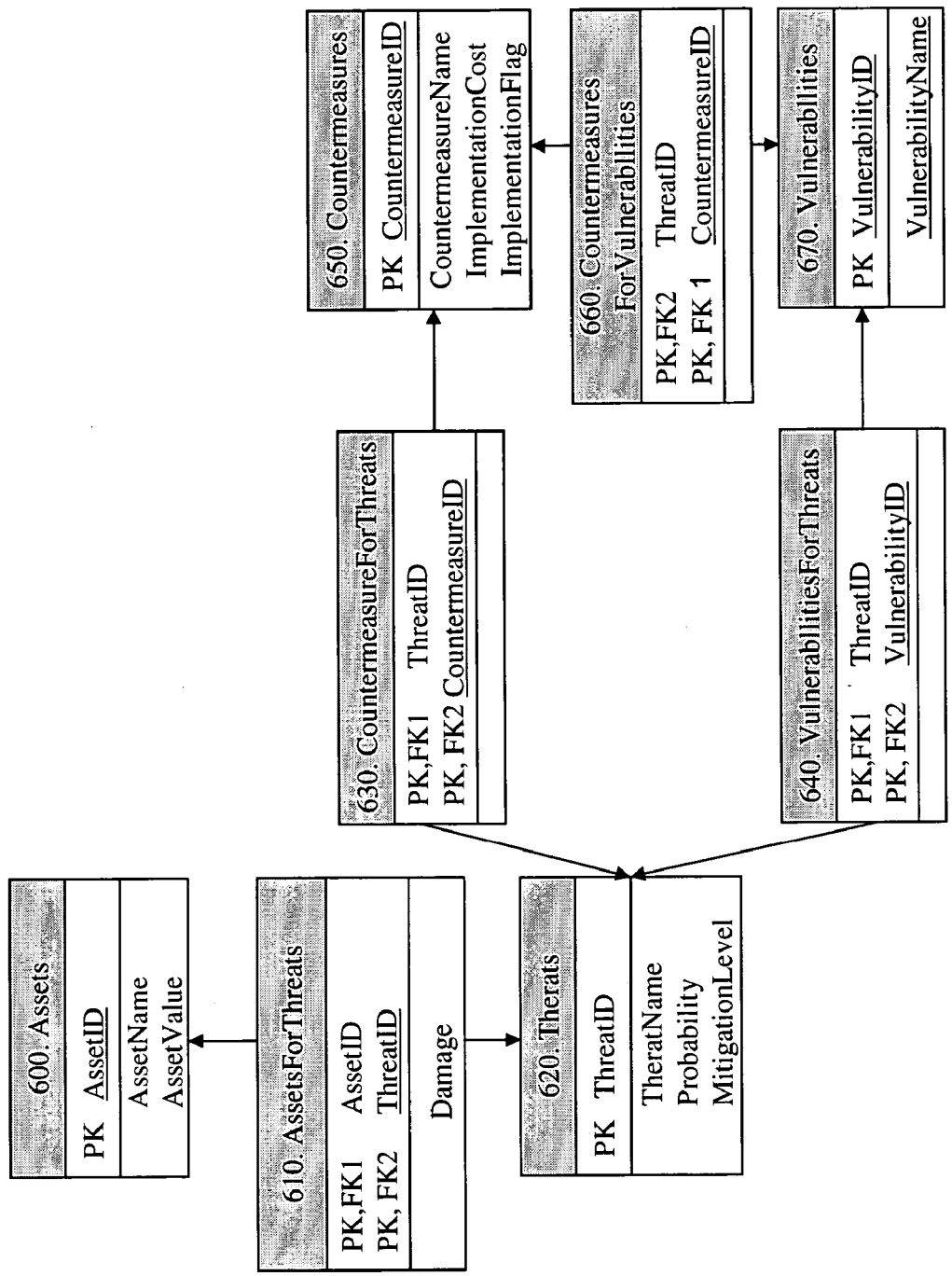
FIG. 1 illustrates a structure of the data storage in accordance with the preferred embodiments of the present invention.

Vulnerability: a weakness, limitation or deficiency in one or more of the system's elements that can be exploited to disrupt its normal functionality. The weakness or defect may be either in specific areas of the system, its layout, its users, operators, and/or in its associated regulations, operational and business procedures.

Countermeasure: a procedure, action or mean for mitigating a specific vulnerability. A specific countermeasure may mitigate several different vulnerabilities.

Asset: an ability, an advantage, a feature, a financial or a technical resource that may be damaged, lost or disrupted. The damage to an asset may affect the normal functionality of the system as well as harm the individuals and/or organizations associated with it in some way.

Threat: a scenario that exploits at least one of the system's vulnerabilities and may cause damage to one or more of the system's assets.

Attack: An actual implementation of a threat.

Threat's risk: a quantified measure that expresses the financial loss and/or damage that may be caused to one or more of the system's assets due to the specific threat.

Threat's recommended countermeasures: a set of countermeasures that may mitigate the threat's risk. Since a threat may take advantage of one or more vulnerabilities, the set of countermeasures against the threat, includes all the countermeasures that mitigate at least one of the threat's vulnerabilities.

Threat's actual mitigation: a subset of threat's recommended mitigation that is assumed to be effective for mitigating a specific threat.

Countermeasure cost-effectiveness: the degree of mitigation introduced by a specific countermeasure to the overall risk in the system in relation to the cost of implementing it.

Threat analysis: the process of identifying system's vulnerabilities, threats and countermeasures and calculating their quantitative parameters, such as threats risk and countermeasures cost-effectiveness.

Quantitative valuation of threats and countermeasures: a calculative process for valuating the risk of each of the threats to the system, translating it to financial values, computing the cost-effectiveness of each of the proposed countermeasures and setting priorities in protecting the system against threats.

Threat modeling: the organization of threat-related data in a dynamic data model that adjusts quantitative parameters of threats and countermeasures according to changes in the system assets and vulnerabilities.

DETAILED DESCRIPTION OF THE INVENTION

The present invention is a new method for performing risk analysis. The method enables users to dynamically estimate the relative contribution of each threat in a given system to the overall risk combined with the cost-effectiveness of the proposed countermeasures. The method therefore enables ranking the countermeasures according to their estimated effectiveness. The method therefore provides a practical threat analysis methodology and tools for maintaining a dynamic threats model and is capable of reacting to changes in system's assets and vulnerabilities by automatically recalculating threats risks and countermeasures priorities and providing decision makers with updated realistic action item lists that reflect the changes in threats realities. Countermeasure priorities are expressed as a function of system asset values, degrees of damage, threat probabilities and degrees of mitigation provided by the proposed countermeasures to the threats.

Figure 2:
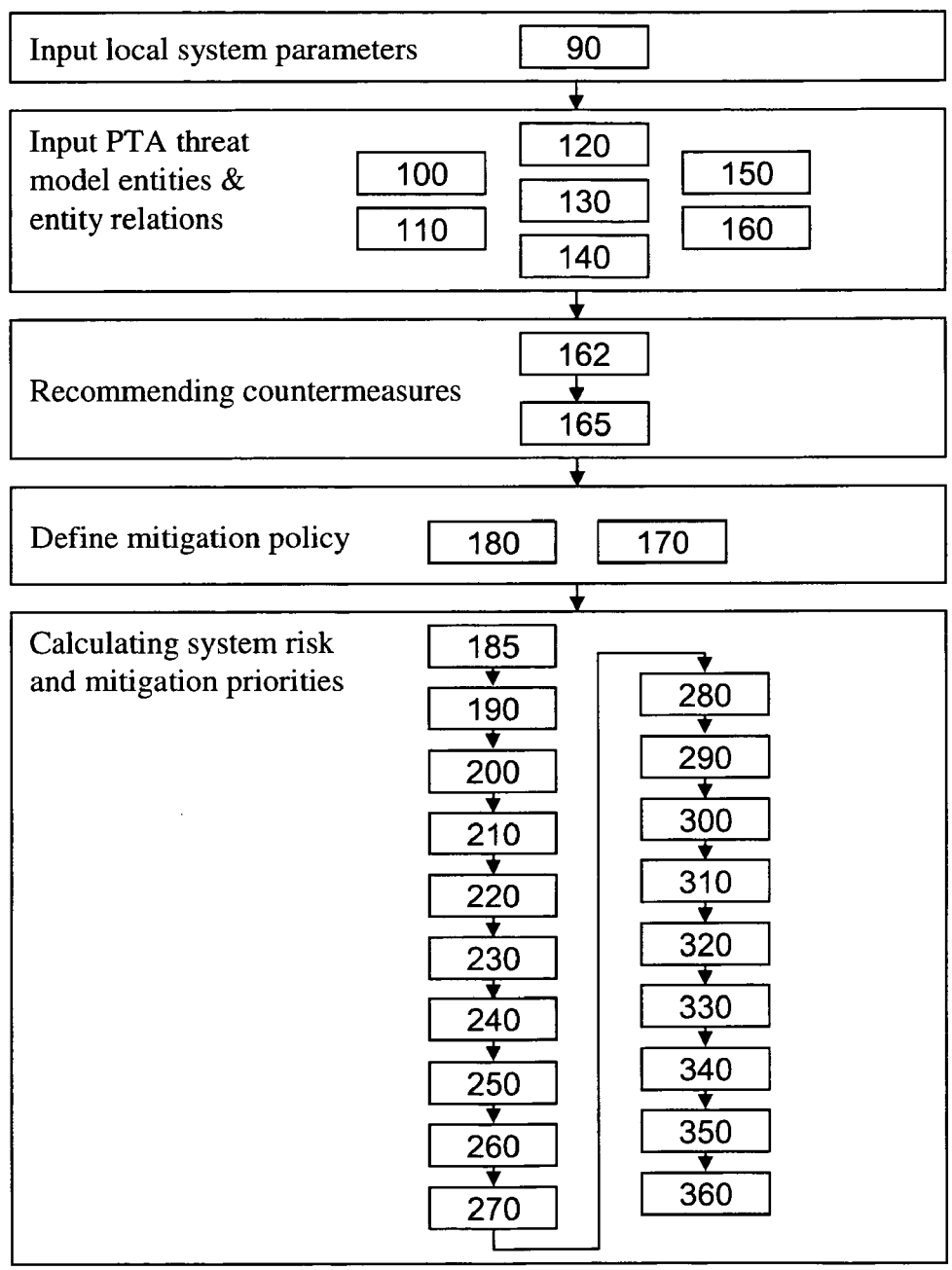
FIG. 2 illustrates the flow diagram of the calculation method in accordance with the preferred embodiments of the present invention.

Reference is now made to FIG. 2 illustrating the flowchart of the calculation method.

Step 90: Input the time period and currency type parameters. Time period [t] and currency type [c] parameters are used as units of the calculated financial values. For example: when [t]='annual' and [c]='USD' then a financial value such as an asset value is expressed in USD per year. If the [t]

parameter is omitted then the calculation treats the monetary values as fixed one time values with no recurring factor over time.

Step 100: Input list of system assets. The set $\{A1, \ldots, ANa\}$ includes all system assets that may be threatened. Each asset is identified by a unique ID and name and assigned with a value of asset (ValA) that represents the maximal financial value of the damage that may be caused to the system due to the loss of the asset.

$\{A1, \ldots, ANa\}$—Set of system assets.

ValA(Ai)—Value of asset of the i-th asset; value of ValA$\geq$0.

Step 110: Input list of system vulnerabilities. The set $\{V1, \ldots, VNv\}$ includes all system vulnerabilities that may be exploited to threaten system assets. Each vulnerability is identified by a unique ID and name.

$\{V1, \ldots, VNv\}$—Set of system vulnerabilities.

Step 120: Input list of system countermeasures. The set $\{C1, \ldots, CNc\}$ includes all countermeasures that may mitigate system vulnerabilities. Each countermeasure is identified by a unique ID and name and assigned with its estimated implementation cost (IC) that represents the financial value of the implementation of the countermeasure. Each countermeasure is also assigned with a Boolean implementation flag (IF) indicating whether or not the countermeasure has been already implemented.

$\{C1, \ldots, CNc\}$—The set of system countermeasures.

IC(Ci)—Implementation cost of the i-th countermeasure; value of IC$\geq$0.

IF(Ci)—Implementation flag of the i-th countermeasure; value of IF=$\{$true, false$\}$.

Step 130: Input list of system threats. The set $\{T1, \ldots, TNt\}$ includes all threats that may threaten system assets. Each threat is identified by a unique ID and name and assigned with the estimated threat probability (TP) that it will materialize within the time period [t]. The TP values may range between 0 and 1 where 0 means that threat scenario will never materialize in the [t] period and 1 means that it will certainly materialize at least once within [t]. If the [t] parameter is omitted then the TP value refers to the whole life time of the system.

$\{T1, \ldots, TNt\}$—The set of system threats.

TP(Ti)—Threat probability of the i-th threat; 0$\leq$value of TP$\leq$1.

Step 140: Input the relations between threats and assets. Each threat is associated with threat assets (TA) that includes the assets that may be damaged if the threat materializes. Each threat is assigned with the relative threat asset damage (RelTAD) that is the level of the damage that may be caused by the threat to each of the assets in the TA of the specific threat. The damage is expressed in percents where 0% means that no damage is caused to the asset if the threat materializes and 100% means that the damage caused to the asset by the threat is total and equals to the whole asset's value.

TA(Ti)—Threat assets of the i-th threat; a non-empty subset of $\{A1, \ldots, ANa\}$ that may be damaged by the i-th threat.

RelTAD(Ti, Aj)—Relative threat asset damage that may be caused by the i-th threat to the j-th asset in TA(Ti); 0$\leq$value of RelTAD$\leq$100.

Step 150: Input the relations between vulnerabilities and countermeasures. Each of the vulnerabilities is associated with vulnerability countermeasures (VC) that includes countermeasures providing some mitigation to the vulnerability.

VC(Vi)—Vulnerability countermeasures of the i-th vulnerability; a subset of $\{C1, \ldots, CNc\}$ that may mitigate the i-th vulnerability.

Step 160: Input the relations between threats and vulnerabilities. Each of the threats is associated with threat vulnerabilities (TV) that includes one or more vulnerabilities that are exploited in the threat scenario.

TV(Ti)—Threat vulnerabilities of the i-th threat; a non-empty subset of $\{V1 \ldots VNv\}$ that are exploited by the i-th threat.

Step 162: Calculating the relations between vulnerabilities and countermeasures. Each of the countermeasures is automatically associated with countermeasure vulnerabilities (CV) that includes one or more vulnerabilities for which it provides some mitigation. CV is calculated from the inputs in step 150.

CV(Ci)—Countermeasure vulnerabilities of the i-th countermeasure; a non-empty subset of $\{V1, \ldots, VNv\}$ that may be mitigated by the i-th countermeasure.

Step 165: Calculating the set of recommended countermeasures for each threat. Each threat is automatically associated with a set of recommended countermeasures mitigating threat (RCMT) that includes the countermeasures that may mitigate the threat. RCMT is calculated from the inputs in step 150 and step 160.

RCMT(Ti)—Recommended countermeasures mitigating threat for the i-th threat; a set of countermeasures that may mitigate the i-th threat. RCMT(Ti) is a subset of $\{C1, \ldots, CNc\}$.

Step 170: Define the actual mitigation sets of countermeasures for each of the threats. An actual countermeasures mitigating threat (ACMT) of a specific threat is a subset of the RCMT associated with that threat which, in order to be efficient, has to be implemented as a whole. There can be several ACMTs for a given threat, each representing a different possible solution to the specific threat. A set which is a union of several ACMTs may also be defined by the user as a valid ACMT.

ACMTj(Ti)—The j-th actual countermeasures mitigating threat for the i-th threat; a subset of RCMT(Ti) that provides some mitigation for the i-th threat.

An ACMTj(Ti) is said to be implemented if all of its countermeasures are implemented, otherwise it is considered as not implemented.

Step 180: Define the threat's mitigation level for each of the actual mitigation sets of countermeasures. The actual countermeasures mitigating threat level (ACMTL) of a given ACMT for a specific threat is the level of the overall mitigation provided by the countermeasures in the ACMT to the risk posed by that threat. The ACMTL is expressed in percents where 0% means that the risk posed by the threat is not reduced by the specific ACMT and 100% means that the risk posed by the threat is completely mitigated by the ACMT.

ACMTLj(Ti)—The actual countermeasures mitigating threat level provided by the j-th ACMT to the i-th threat; 0<value of ACMTL$\leq$100; The ACMTL of a union of several ACMTs should be greater or equal to the maximum value of the separate ACMTLs.

Step 185: Calculating the maximal and current mitigation level for each threat.

MaxTM(Ti)—Maximal threat mitigation level is the maximum over all of the ACMTLj(Ti) (i is fixed, j varies); 0<value of MaxTM$\leq$100.

CurTM(Ti)—Current threat mitigation level is the maximum over all of the implemented ACMTLj(Ti) (i is fixed, j varies); 0<value of CurTM$\leq$100.

Step 190: Calculating the total value of all system assets. Value of all system assets (ValSA) is calculated by summing the ValA of all assets.

ValA—Value of all system assets.

ValSA=ΣValA (Ai) where i runs over all assets

Step 200: Calculating the relative value of each asset. Relative value of asset (RelValA) is the percentage of the value of a specific asset ValA out of the total value of all system assets. It is calculated by dividing the asset's value ValA by the total value of all assets ValSA and multiplying by 100.

RelValA(Ai)—Relative value of the i-th asset.

RelValA(Ai)=ValA(Ai)/ValSA*100; 0<value of RelValA≦100.

Step 210: Calculating the relative damage level of each threat. Relative threat damage (RelTD) is the percentage of the damage of a specific threat out of the total value of assets in the system. It is calculated by summing the multiplications of the relative damage that may be caused by the threat to a specific asset RelTAD divided by 100 by the relative value of that asset RelValA.

RelTD(Ti)—Relative threat damage that may be caused by the i-th threat to the system's assets.

RelTD(Ti)=ΣRelTAD(Ti, Aj)/100*RelValA(Aj) where j runs over all assets; 0<value of RelTD≦100.

Step 220: Calculating the maximal risk level of each threat. Maximal threat risk (MaxTR) is the expected damage, in percents out of the total value of assets in the system that may be caused by a specific threat Ti if none of the ACMTs for this threat is implemented. It is calculated by multiplying the relative damage RelTD of the threat by the threat's probability TP.

MaxTR(Ti)—Maximal threat risk of the i-th threat.

MaxTR(Ti)=RelTD(Ti)*TP(Ti); 0<value of MaxTR≦100.

Step 230: Calculating the minimal risk level of each threat. Minimal threat risk (MinTR) is the expected damage, in percents out of the total value of assets in the system that may be caused by a specific threat Ti if the most efficient ACMT (the one with the highest ACMTL) for this threat is implemented. It is calculated by multiplying the threat's maximal risk MaxTR by a factor that expresses the unmitigated part of the threat that is left after the most efficient ACMT is implemented.

MinTR(Ti)—Minimal threat risk of the i-th threat.

MinTR(Ti)=MaxTR(Ti)*(1−MaxTM(Ti)/100); 0<value of MinTR≦100.

Step 240: Calculating the current risk level of each threat. Current threat risk (CurTR) is an approximation of the expected damage, in percents out of the total value of assets in the system, that may be caused by a specific threat taking into account the current mitigation provided by the implemented ACMTs for this threat. It is calculated by multiplying the threat's maximal risk MaxTR by a factor that expresses the unmitigated part of the threat that is left taking into account only the currently implemented ACMTs for the threat.

CurTR(Ti)—Current threat risk of the i-th threat.

CurTR(Ti)=MaxTR(Ti)*(1−CurTM(Ti)/100); 0<value of CurTR≦100.

Step 250: Calculating the maximal risk for each asset. Maximal asset risk (MaxAR) is the upper bound, in percents relative to the total value of assets in the system, on the expected risk to a specific asset by all threats that may damage that specific asset, assuming that no countermeasures are implemented for any threat. It is calculated by averaging the relative damage that each threat may cause to the specific asset. The threats are weighted by their probabilities.

MaxAR(Ai)—Maximal asset risk for the i-th asset.

MaxAR(Ai)=ΣRelTAD(Tj, Ai)*TP(Tj) where j runs over all threats that may cause damage to Ai; value of MaxAR may exceed 100.

Step 260: Calculating the minimal risk for each asset. Minimal asset risk (MinAR) is the lower bound, in percents relative to the total value of assets in the system, on the expected risk to a specific asset by all threats that may damage that specific asset, assuming that all of the ACMTLj(Ti) of all the threats are implemented. It is calculated by averaging the relative damage that each threat may cause to the specific asset multiplied by a factor that expresses the unmitigated part of the threat that is left after all countermeasures are implemented. The threats are weighted by their probabilities.

MinAR(Ai)—Minimal asset risk for the i-th asset.

MinAR(Ai)=ΣRelTAD(Tj, Ai)*(1−MaxTM(Tj)/100)*TP(Tj) where j runs over all threats that may cause damage to Ai; value of MinAR may exceed 100.

Step 270: Calculating the current risk for each asset. Current asset risk (CurAR) is the current risk to a given asset, in percents relative to the total value of assets in the system, taking into account the currently implemented countermeasures. It is calculated by averaging the relative damage that each threat may cause to the specific asset multiplied by a factor that expresses the unmitigated part of the threat that is left when the currently implemented ACMTLj(Ti) are taken into account. The threats are weighted by their probabilities.

CurAR(Ai)—Current asset risk for the i-th asset.

CurAR(Ai)=ΣRelTAD(Tj, Ai)*(1−CurTM(Tj)/100)*TP(Tj) where j runs over all threats that may cause damage to Ai; value of CurAR may exceed 100.

Step 280: Calculating the total system maximal risk. Maximal value of system risk (MaxValSR) is the financial value of the risk to the system if no countermeasures are implemented. It is calculated by summing the multiplications of the asset's maximal risk MaxAR by the asset's value ValA for each of the assets in the system. Maximal system risk (MaxSR) is the risk to the system, in percents relative to the total value of all assets, if no countermeasures are implemented. It is calculated by dividing MaxValSR by the total value of all assets ValSA and multiplying it by MaxValSR—Maximal value of system risk MaxValSR=ΣMaxAR(Ai)/100*ValA(Ai) where i runs over all assets; value of MaxValSR may exceed ValSA.

MaxSR—Maximal system risk

MaxSR=MaxValSR/ValSA*100; value of MaxSR may exceed 100.

Step 290: Calculating the total system minimal risk. Minimal value of system risk (MinValSR) is the financial value of the risk to the system if all countermeasures are implemented. It is calculated by summing the multiplications of the asset's minimal risk MinAR by the asset's value ValA for each of the assets in the system. Minimal system risk (MinSR) is the risk to the system, in percents relative to the total value of all assets, if all countermeasures are implemented. It is calculated by dividing MinValSR by the total value of all assets ValSA and multiplying it by 100.

MinValSR—Minimal value of system risk

MinValSR=ΣMinAR(Ai)/100*ValA(Ai) where i runs over all assets; value of MinValSR may exceed ValSA.

MinSR—Minimal system risk

MinSR=MinValSR/ValSA*100; value of MinSR may exceed 100.

Step 300: Calculating the total system current risk. Current value of system risk (CurValSR) is the financial value of the risk to the system taking into account the contribution of countermeasures already implemented. It is calculated by summing the multiplications of the asset's current risk CurAR by the asset's value ValA for each of the assets in the system. Current system risk (CurSR) is the risk to the system, in percents out of the total value of all assets, taking into account the contribution of countermeasures already implemented. It is calculated by dividing CurValSR by the total value of all assets (ValSA) and multiplying it by 100.

CurValSR—Current value of system risk

CurValSR=ΣCurAR(Ai)/100*ValA(Ai) where i runs over all assets; value of CurValSR may exceed ValSA.

CurSR—Current system risk

CurSR=CurValSR/ValSA*100; value of CurSR may exceed 100.

In the user interface, the actual values of the three total risk quantities, calculated in steps 280 to 300, are displayed in the status screen graph, although they may exceed 100%. A marker indicating the 100% risk level may be added for the user's convenience. It is clear that the actual damage to the system's assets cannot exceed 100%; however, the risk level is not equivalent to the actual damage. It reflects the amount of effort that has to be invested in order to mitigate the threats on the system, and since neither the number of threats nor their severity are limited, the risk quantities cannot be limited to 100%.

Step 310: Calculating the relative maximal threat risk for each threat. Relative maximal threat risk (RelMaxTR) is the percentage of the maximal risk of a specific threat out of the total system maximal risk MaxSR. It is calculated by dividing the maximal threat risk MaxTR of the specific threat by the total system maximal risk MaxSR.

RelMaxTR(Ti)—Relative maximal threat risk of the i-th threat

RelMaxTR(Ti)=MaxTR(Ti)/MaxSR*100; 0<value of RelMaxTR≦100.

Step 320: Calculating the relative minimal threat risk for each threat. Relative minimal threat risk (RelMinTR) is the percentage of the minimal risk of a specific threat out of the total system minimal risk MinSR. It is calculated by dividing the minimal threat risk MinTR of the specific threat by the total system minimal risk MinSR.

RelMinTR(Ti)—Relative minimal threat risk of the i-th threat

RelMinTR(Ti)=MinTR(Ti)/MinSR*100; 0<value of RelMinTR≦100.

Step 330: Calculating the relative current threat risk for each threat. Relative current threat risk (RelCurTR) is the percentage of the current risk of a specific threat out of the total system current risk CurSR. It is calculated by dividing the current threat risk CurTR of the specific threat by the total system current risk CurSR.

RelCurTR(Ti)—Relative current threat risk of the i-th threat

RelCurTR(Ti)=CurTR(Ti)/CurSR*100; 0<value of RelCurTR≦100.

Step 340: Calculating the current overall countermeasure mitigation level for each countermeasure. Current countermeasure mitigation (CurCM) of a specific countermeasure is the percentage of contribution of a specific countermeasure to the reduction of the current system risk CurSR. It is calculated by dividing the difference of CurSRCNotI and CurSRCI by CurSRCNotI and multiplying it by 100. CurSRCI is the system risk calculated under the assumption that the specific countermeasure is implemented and all other countermeasures are in their current implementation status. CurSRCNotI is the system risk calculated under the assumption that the specific countermeasure is not implemented and all other countermeasures are in their current implementation status.

CurCM(Ci)—Current countermeasure mitigation of the i-th countermeasure.

CurSRCI(Ci)=CurSR assuming the i-th countermeasure is implemented and all other countermeasures are in their current implementation status.

CurSRCNotI(Ci)=CurSR assuming the i-th countermeasure is not implemented and all other countermeasures are in their current implementation status.

CurCM(Ci)=(CurSRCNotI(Ci)−CurSRCI(Ci))/CurSRCNotI(Ci)*100; 0<value of CurCM≦100.

Step 350: Calculating the current cost effectiveness of each countermeasure. Current countermeasure cost effectiveness (CurCCE) of a specific countermeasure is the current overall countermeasure mitigation CurCM per unit of implementation cost in [c]. It is calculated by dividing the current countermeasure mitigation CurCM by the implementation cost IC of the countermeasure.

CurCCE(Ci)—Current countermeasure cost effectiveness of the i-th countermeasure.

CurCCE(Ci)=CurCM(Ci)/IC(Ci).

Step 360: Calculating an optimized risk reduction plan. Optimized risk reduction plan (OptRRP) is an optimized subset of the countermeasures that if implemented will reduce the total current risk level CurSR below a given target risk level (TarR) and within the limits of a given target budget (TarB). There are three optimization options: optimize by cost effectiveness (OptCE) and, optimize by risk (OptR) and optimized by cost (OptC).

The two targets, TarR and TarB, define a set of solutions that meet these targets. Each solution is a subset of the set of currently unimplemented countermeasures, such that if implemented as a whole will reduce the current total risk level below TarR and the cost of its implementation will not rise above TarB. The three methods of optimization further narrow the set of solutions: the OptCE, offers the solutions which are the most cost effective; the OptR, offers the solutions which achieve a maximal risk reduction; and the OptC, offers the solutions whose cost of implementation is the lowest.

It is important to note that in order to offer the fastest risk reduction plan, the user needs to input, for each countermeasure, its period of implementation or some other parameter that reflects the complexity of the operation. The number of countermeasures in a solution is not necessarily the appropriate indicator for such a parameter.

It is also important to note that at certain situations conflicts between countermeasures may occur. For example, a countermeasure that mitigates a specific vulnerability may contradict the mitigating effect of another countermeasure which is aimed at the same or at different vulnerability. At these situations the user needs to indicate the pairs of conflicting countermeasures that might affect both the risk calculations and the recommendation on the appropriate risk reduction plans.

This concludes the practical threat analysis process. The effectiveness and cost-effectiveness of countermeasures is calculated by the rules described above that enable the arranging of countermeasures in a prioritized action item list for the use of the system's decision makers.

Input steps 100 to 160 of the calculation method may be implemented by intelligent user-friendly input wizards with graphical user interface that enable analyst to enter the entities information and their interrelations. The input of the entities information and some of the relations in these steps may be automated by connecting to online store with information on known assets, threats, vulnerabilities and countermeasures and their relations, as well as to any other pre-defined database. Input steps 170 to 180 of the calculation method may be implemented by the software via user-friendly intelligent input wizards that enable the analyst to enter the mitigation policy and threat mitigation levels.

Threat Analysis of Example 1: a simplified car and passenger case

Figure 3:
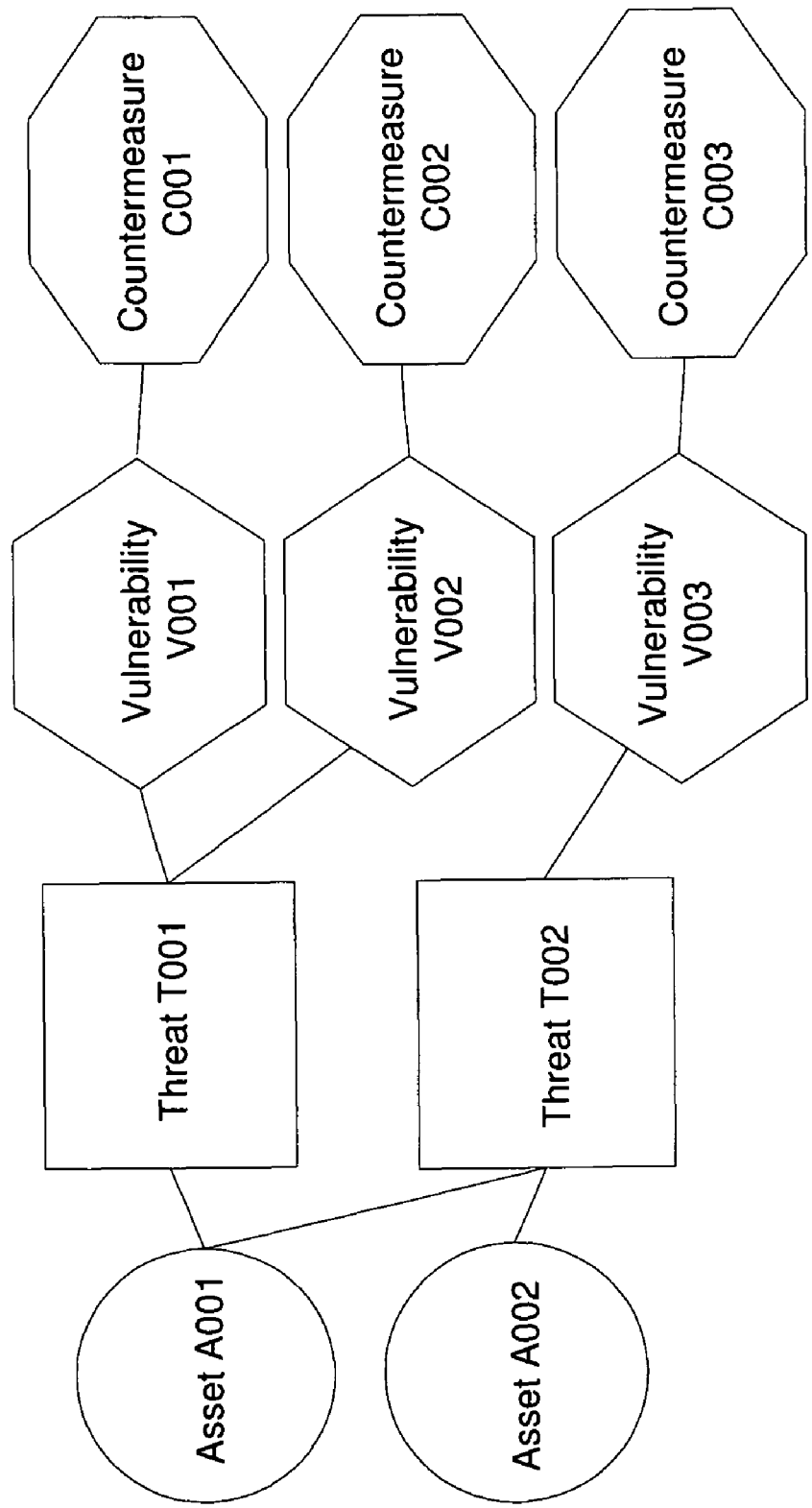
FIG. 3 illustrates the threat model entities of the threat analysis of example 1.

FIG. 3 illustrates the threat model entities of the threat analysis of example 1. The system in this simplified example is comprised of a car and a passenger. The assets are: the car itself (A001) and the passenger's well being (A002). The vulnerabilities are: the car's windows, which are made of ordinary glass and therefore may be easily broken (V001), the car may be started by connecting wires that bypass the ignition key (V002) and the fact that the car is not protected against gun fire and therefore shooting bullets may penetrate it (V003). The countermeasures for the vulnerabilities in the example are: install an alarm system (C001), install an immobilizer protection system (C002) and armor the vehicle (C003).

For the sake of simplicity, only two threats are identified: the car may be stolen (T001) and the car and the passenger may be severely hurt by a gun fire attack (T002). Threat T001 damages asset A001 and exploits vulnerabilities V001 and V002. Threat T0001 damages assets A001 and A002 and exploits vulnerability V003.

See Appendix A for a detailed calculation of example 1. As illustrated in the flow diagram of FIG. 2, the calculation includes the specified steps. At step 90 the time period and the currency type parameters are entered. As is shown in Appendix A, the time period in the current example is defined as a fixed one time period, and the currency type is American dollar. Next, at steps 100 to 130 the system's assets, the system's vulnerabilities, the countermeasures and threats are specified according to the description above. At steps 140 the relations between the threats and the assets are defined and threat T001—the stealing of the car—is defined as threatening asset A001—the car itself, whereas threat T002—the gunfire attack—is defined as threatening both asset A001 and asset A002—the car and its passenger. In this example both threats pose 100% damage on the assets associated to them. The relations between the vulnerabilities and the countermeasures are define at step 150 and the relations between the threats and the vulnerabilities are defined at step 160: threat T001—the stealing of the car—exploits vulnerabilities V001 and V002—the cars windows, which may be broken, and the car ignition which may be done by crossing wires instead of using the key. Threat T002—the gunfire attack—exploits vulnerability V003—the fact that bullets may penetrate the car.

In steps 162 and 165 the recommended countermeasures for each threat are calculated, and at steps 170 and 180 the mitigation policies are defined. After the initial definitions are entered, the system performs the risk and mitigation priorities, as they are specified in great details in Appendix A. The results provide a clear prioritized list for implementing the countermeasures according to their calculated cost effectiveness: installing an alarm and an immobilizer are recommended since they provide risk reduction of 0.4167% for each dollar. Arming the vehicle is much less recommended since the risk reduction it provides is only 0.00075% for each dollar. The ratio of the two values of cost effectiveness is 1:555 in favor of installing an alarm and an immobilizer.

The current calculation would change significantly if instead of an ordinary driver the passenger of the car is a top government official. In this case the probability for car theft is estimated to be a relatively low 0.01 but the likelihood of a terrorist attack is estimated to be a high 0.5. In step 240, where the current risk level of each thread is calculated, T001 risk changes to 0.05% and T002 risk changes to 50%. The following calculation change accordingly the cost effectiveness of each countermeasure and yields the following results: installing an alarm and an immobilizer are not recommended since the risk reduction they provide is only 0.001% for each dollar, but arming the vehicle is found to provide 0.005% of risk reduction for each dollar. It is evident then that the order of countermeasures in the prioritized list changes and the ratio of the cost effectiveness is 1:5 in favor of armoring the vehicle.

Preferred Data Storage Structure

FIG. 1 illustrates the preferred structure of the data storage that is required for implementing the many-to-many relations between the entities and is needed for the calculative method described above. Relational database or other data storage engine may be used for implementation.

Tables Assets (600), Threats (620), Vulnerabilities (670) and Countermeasures (650) are used for storage of system's assets, threats, vulnerabilities and countermeasures accordingly. Table AssetsForThreats (610) is used for storage of relations between system threats and system assets. AssetsForThreats has a field for threat-asset Damage. Table CountermeasuresForVulnerabilities (660) is used for storage of relations between vulnerabilities and countermeasures. Table VulnerabilitiesForThreats (640) is used for storage of relations between threats and vulnerabilities. Table CountermeasuresForThreats (630) is used for storage of relations between threats and countermeasures.

Combining calculation method with data storage for maintenance of evolving threat models:

The calculation and data storage described above may be used for maintenance of threat models of evolving systems where parameters and entities are changed and updated. In each step of the system evolution, the user of the computerized system who implements the calculation method may see the calculated values derived from the inputs entered in previous steps. The user may then change various parameters of the inputs, add additional entities such as assets, threats, vulnerabilities and countermeasures and see the reaction of the calculated values to the changes.

Using calculation method for optimization of risk reduction policies in systems:

After a threat model is built and threat analysis outputs have been calculated, the calculation method may be used for optimization risk reduction policies in the analyzed system by finding the optimal set of countermeasures according to criteria provided by the analyst.

The optimization process is performed on a complete threat model by setting the "implemented" flag IF to "True" for various combinations of countermeasures and learning the changes in the value of the system's current risk according to the output of the calculation method. The process is performed in an iterative fashion by using the mitigation results reported by the calculation method on previous steps for choosing the set of countermeasures for the next guess. The iterative process can be done manually by the analyst or automatically by the software that calculates the mitigation results for the most promising combinations of countermeasures.

The priorities of countermeasures to be implemented are chosen by their cost-effectiveness or by additional countermeasure attributes, such as area of implementation. The goal of the iterative optimization process is to find the most cost effective combination of countermeasures with specified attributes which reduce the total risk to the requested target level. The analyst may learn from the results of the optimization that such combination does not exist, and in this case it may be practical to review the starting parameters of the optimization process.

Preferred Reports:

The first report displays an action item list showing countermeasures in a decreasing order of their overall mitigation. Each countermeasure is associated with a list of threats that are mitigated by countermeasures and their risk parameters. The second report displays an action item list showing countermeasures in a decreasing order of their cost-effectiveness. Each countermeasure is associated with a list of threats that are mitigated by countermeasure and their risk parameters. The third report displays an optimized set of countermeasures that may reduce the total system risk to a specific required level.

Preferred Application Embodiments

The first application embodiment is a suite of desktop computer applications connected to the threat model data storage. This type of applications is preferable for individuals or organizations with small number of employees that access the threat analysis data.

The second application embodiment is an enterprise Web application providing simultaneous access to threat model data to a large numbers of concurrent users. This type of application is preferable for big organizations or government units.

The third application embodiment is a hosted application service providing threat modeling tools to users without deploying them on their machines. Such service is preferable for organizations willing to pay for threat analysis products in proportion with the actual usage without buying standalone installation of the system. The service may be protected with modern data protection technologies to prevent leakage of threat information.

The fourth application embodiment is threat analysis data storage, processing mechanisms and algorithms delivered in form of an API (application programming interface). This approach enables the integration of threat analysis functionality with existing systems, such as ERP (enterprise resource planning), AVS (automatic vulnerabilities scanning), SEM (security events management), ISM (information security management) and IDE (interactive development environment), in order to provide enhanced security solutions.

Preferred Visual Tools Embodiments

A variety of visual tools are offered to help the analyst in building and valuating threat models. These tools may be Web-based or desktop computer applications. Several examples of most productive visual tools are provided here.

The Model Explorer is a visual tool that enables the display, creation and modification of any type of entities that form the threat model. The Model Explorer displays lists of available threats, vulnerabilities, countermeasures, assets etc. When a single item in the list is selected, the tool displays a details screen containing all the properties of the selected entity. Some properties such as threat risk or countermeasure cost-effectiveness are calculated automatically according to calculation methods described above. The Model Explorer enables editing the properties of each entity and establishing relationships between the entities. The creation of new entities and deletion of existing entities are supported in the corresponding entity list screens.

The Threat Builder is a visual tool that enables the quick creation of threat model using the core mandatory entities: assets, threats, vulnerabilities and countermeasures. The tool enables the establishment of relationships between the core entities in a straight forward easy-to-use user interface, skipping the need to enter the details of each entity. The main screen of the Threat Builder presents lists of assets, threats, vulnerabilities and countermeasures and the tree representation of their interrelations. The quantity of data that is displayed for each entity is minimal and intended to facilitate the modeling task. The analyst is able to create each type of entity and establish the relations between the entities in a single user interface operation. After creating the mandatory model entities with the Threat Builder, the analyst is prompted to utilize the Model Explorer tool for entering the details required for calculation of threat risk and countermeasure cost-effectiveness.

Figure 4:
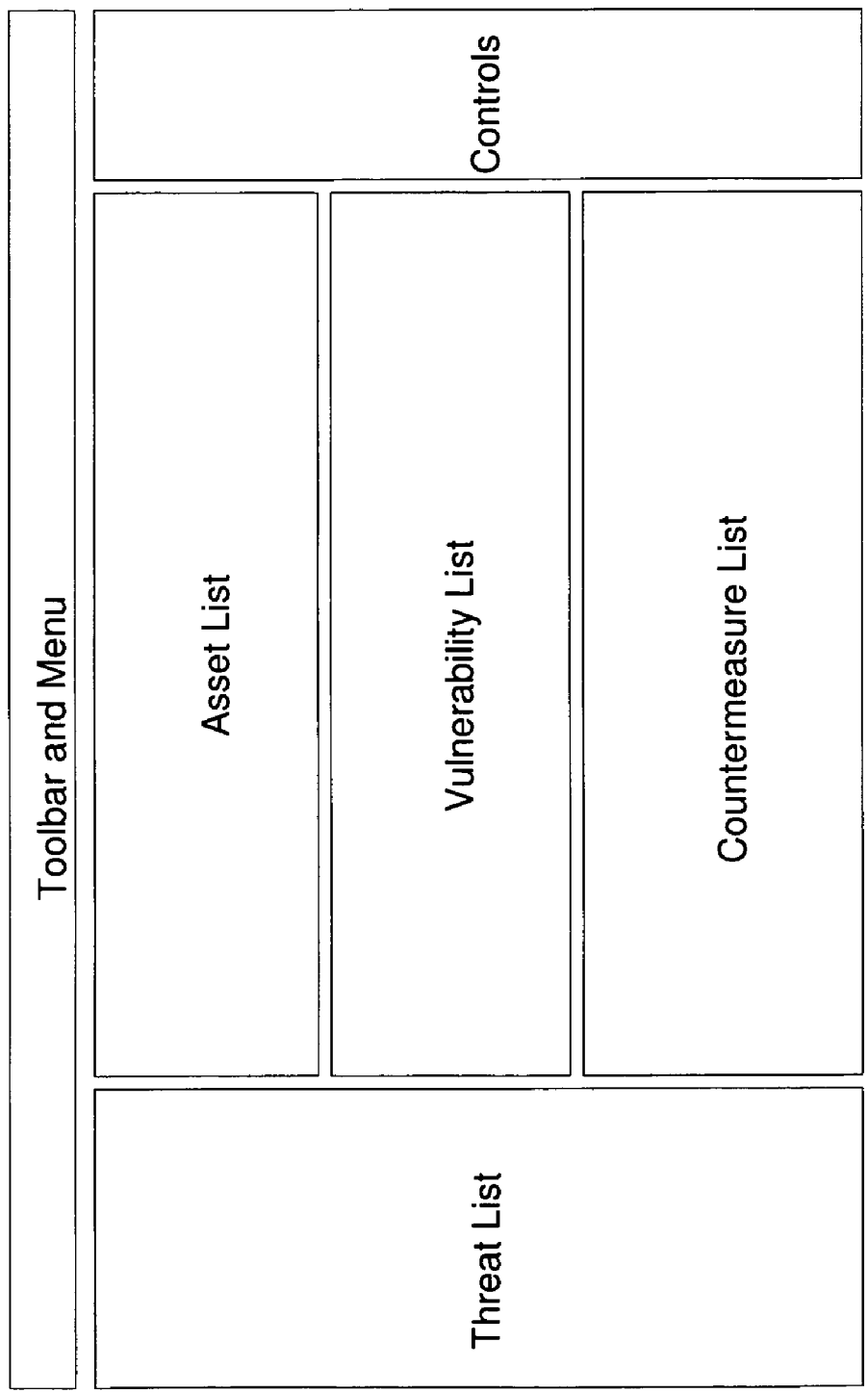
FIG. 4 illustrates a structure of the threat builder visual tool in accordance with the preferred embodiments of the present invention.

FIG. 4 illustrates the structure of the Threat Builder visual tool. It contains lists of threats, assets, vulnerabilities and countermeasures. When a threat is selected in the threat list, its related entities are displayed in the other lists. The controls area contains buttons or other controls used for adding entities, removing entities and establishing associations between entities. The menu and the toolbar area contain menus and toolbar buttons used for performing common tasks, such as loading and saving threat models.

While this invention has been shown and described in connection with the embodiments described, it is apparent that certain changes and modifications, in addition to those mentioned above may be made from the basic features of this invention. In addition, there are many different types of computer systems, and computer software and hardware, and tools that may be utilized in practicing the invention, and the invention is not limited to the examples given above. Accordingly, it is the intention of the applicants to protect all variations and modifications within the valid scope of the present invention. It is intended that the invention be defined by the following claims, including all equivalents.

What is claimed is:

1. A method for organizing, updating and maintaining a dynamic threat analysis model that provides a risk assessment of a given system comprising assets, said method comprising:
   providing a dynamic data structure that represents interrelations between model entities of the system, including assets of the system and associated assets values, threat scenarios, vulnerabilities of the system and countermeasures including implementation cost of each countermeasure, wherein each risk is caused by at least one threat scenario, multiple threat scenarios can cause single risk, and multiple risks can be caused by a single threat scenario, and wherein the dynamic data structure is implemented by many to many rational database including:
      (i) an AssetsForThreats table usable to store relations between system threats and system assets, which include a field for threat-asset damage,
      (ii) a Table CountermeasuresForVulnerabilities table usable to store relations between vulnerabilities and countermeasures,
      (iii) a VulnerabilitiesForThreats table usable to store relations between threats and vulnerabilities, and
      (iv) a CountermeasuresForThreats table usable to store relations between threats and countermeasures;
   providing a computerized interface for inserting and updating data of said dynamic model by enabling the following:
      (i) updating and changing system related parameters associated with system entities;
      (ii) updating and changing definitions of interrelations between each of said inputted threat scenarios and at least one vulnerability and at least one asset;

(iii) updating and changing countermeasures of at least one of said inputted vulnerabilities;
(iv) updating and changing associated implementation cost of each countermeasure;
(v) adding additional entities including assets, threats vulnerabilities and countermeasures;
(vi) updating and changing the associated value of each asset;
(vii) updating and changing a threat probability of each threat scenario;
(viii) updating and changing a relative damage of each threat scenario, wherein said relative damage includes damage caused by the threat scenario to each of the assets associated with said threat scenario; and
(ix) updating and changing the countermeasures in a mitigation set and the mitigation level of a mitigation set of at least one of the calculated threat relative risks caused by at least one of the threat scenarios, wherein said mitigation set level indicates valuation of relative risk reduction as a result of implementation of the updated countermeasures in the mitigations set associated with said at least one threat scenario; and applying updates and changes to said dynamic model by processing the following operations:
(i) automatically calculating, via a computerized system, a threat relative risk for each changed threat scenario, wherein said relative risk represents a monetary value of a possible outcome of said associated changed threat scenario and wherein said risk is calculated by multiplying the relative damage to assets of the threat scenario based on asset updated values by the threat probability and based on threat relative damage to each asset;
(ii) automatically calculating, via a computerized system, total system risk change based on calculated threat relative risks of said updated threat scenarios;
(iii) automatically calculating, via a computerized system, change in cost effectiveness of each of the updated countermeasures, according to the mitigation level of updated mitigation set where the mitigation set includes said countermeasures based on the threat relative risk that has been estimated, and the cost of implementing the said counter measure;
(iv) calculating, via a computerized system, an updated optimized risk reduction plan based on the changes in cost effectiveness of the countermeasures and the contribution of each of the countermeasures to reduce damages to the assets in said updated threat scenario in order to reduce the total current system risk level below a given target risk level within a limit of a given target budget, said optimized risk reduction plan being an optimized subset of the countermeasures for implementation, wherein the countermeasure priorities are expressed as a function of system assets values, degrees of damage, threat probabilities and degrees of mitigation provided by the proposed countermeasures to the threats; and
(v) enabling the user to analyze the optimized risk reduction plans before and after changing of at least one parameter of the system model, wherein calculating an optimized risk reduction plan includes an automatic iterative process for testing various combinations of possible implemented countermeasures,
wherein the iterative process includes changing the possible implemented countermeasures and analyzing their calculated priorities according to the inputted level of mitigation level of at least one mitigation set,
wherein the priority calculations are function of system asset values, degrees of damage, threat probabilities and degrees of mitigation provided by the proposed countermeasures to the threats, wherein the iterative process is processed by software that calculates the mitigation results for the most promising combinations of countermeasures,
wherein the operations of applying updates and calculating, are preformed by a computer device, and
wherein the computerized interface and the dynamic data structure are installed on a computer device.

2. The method of claim 1, further comprising calculating the current overall countermeasure mitigation level for each countermeasure, wherein the current overall countermeasure mitigation of a specific countermeasure is the percentage of contribution of a specific countermeasure to the reduction of the current total system risk.

3. The method of claim 1, wherein the valuating relative threat risk is based on calculating the following: the mitigation level for each threat, calculating the total value of and relative value of system assets, calculating the relative damage level of each threat, calculating the risk level of each threat, calculating the risk for each asset and calculating the total system risk.

4. The method of claim 1, wherein the optimization is based on optimizing cost effectiveness.

5. The method of claim 1, wherein the optimization is based on optimizing the risk.

6. The method of claim 1, wherein the optimization is based on optimizing the cost.

7. The method of claim 1, wherein the optimization is based on optimizing countermeasure execution complexity.

8. The method of claim 1, wherein said entities further include attacker types, wherein each attacker type includes a implementer of a threat scenario to the system, wherein each threat is associated with at least one attacker type.

9. The method of claim 8, wherein said entities further include entry points, wherein said entry points define a part of the system through which an attack is implemented, wherein each threat scenario includes at least one entry point.

10. The method of claim 2, wherein the current cost effectiveness of a specific countermeasure is calculated by dividing the overall countermeasure mitigation by the implementation cost of the countermeasure.

* * * * *